United States Patent [19]

Sullivan

[11] 3,981,316

[45] Sept. 21, 1976

[54] PRESSURE AND TEMPERATURE-RESPONSIVE CONTROL MEANS

[75] Inventor: Timothy J. Sullivan, Butte, Mont.

[73] Assignee: Sullivan Valve & Engineering Company, Butte, Mont.

[22] Filed: Nov. 13, 1975

[21] Appl. No.: 631,701

[52] U.S. Cl. .............................. 137/73; 122/504.1; 137/554; 251/68; 337/300; 337/408
[51] Int. Cl.² ........................................ F16K 17/38
[58] Field of Search .............................. 137/72–77; 337/300, 408, 410; 122/504.1

[56] References Cited
UNITED STATES PATENTS

| | | | |
|---|---|---|---|
| 2,778,917 | 1/1957 | Sullivan | 219/516 X |
| 2,871,317 | 1/1959 | Sullivan | 200/81.5 X |
| 3,140,721 | 7/1964 | Sullivan | 137/73 |
| 3,227,144 | 1/1966 | Sigl | 122/504.1 |

FOREIGN PATENTS OR APPLICATIONS 606,721  10/1960  Canada .................................. 137/75

*Primary Examiner*—Martin P. Schwadron
*Assistant Examiner*—Richard Gerard
*Attorney, Agent, or Firm*—Lawrence E. Laubscher

[57] ABSTRACT

Actuator means of the pressure- and/or temperature-responsive type are disclosed for controlling valve means which supply pressure fluid (such as a combustible gas) to a load (such as a gas-fired boiler), characterized in that the actuator means are operable (1) when the boiler pressure exceeds a given limit, (2) when the boiler temperature exceeds a given limit, or (3) when the temperature a given region external of the boiler exceeds a given limit. The valve means is normally in an open condition, said actuator means being operable to close the valve means when at least one of the aforementioned limits is exceeded.

13 Claims, 10 Drawing Figures

PRESSURE AND TEMPERATURE-RESPONSIVE CONTROL MEANS

BRIEF DESCRIPTION OF THE PRIOR ART

It is well known in the patented prior art — as evidenced, for example, by the prior Sullivan U.S. Pat. Nos. 2,778,917, 2,871,317 and 3,140,721 — to provide temperature and/or pressure responsive actuator means for operating load devices (such as the shut-off valves connected in the fuel supply lines to steam boilers and the like).

One drawback of the known devices is their failure to detect or respond to dangerous ambient conditions external of the vessel chamber. Thus, in the event of a fire in the boiler room of a building heated by the boiler means, the possibility exists of ignition of the fuel supplied to the boiler and a resulting dangerous explosion.

SUMMARY OF THE INVENTION

Accordingly, the present invention was developed to provide control means for a boiler or the like including actuator means for interrupting the flow of combustible gas to the boiler in the event that boiler pressure and/or temperature exceed predetermined limits, or the temperature external to the boiler exceeds a predetermined limit.

A primary object of the present invention is to provide actuator means for operating a load device including a pressure-responsive assembly mounted for axial displacement relative to an opening contained in a pressure vessel, such as a boiler, said pressure assembly including a tubular member which is closed at one end to define a probe that extends into the vessel chamber. A rod is arranged coaxially in the tubular member and is secured at one end to the closed probe end by first fusible means. At its other end, the rod is connected with a load operating member by second fusible means. First spring means bias the tubular member away from the load device, and second spring means bias the operating member toward the load device. Consequently, when the pressure in the vessel exceeds a predetermined limit, the pressure assembly is shifted against the biasing force of the first spring means to operate the load device. If the temperature within the vessel exceeds a predetermined limit, the first fusible means melts to release the rod, whereby the rod and the load operating member are displaced by the second spring means to operate the load device. In accordance with a characterizing feature of the present invention, if the temperature external of the vessel exceeds a predetermined limit, the second fusible means melts to release the load operating member, whereby the load operating member is displaced toward the load device by the second spring means.

According to another object of the invention, the actuator means serves to control the operation of a shut-off valve which in turn controls the supply of fuel to the vessel (specifically, a gas- or oil-fired boiler). The load device, which is normally supported on a ledge, is connected with the shut-off valve to normally maintain the same in an open condition. When the load device is actuated by the actuator means, the load device is displaced from its supporting ledge and the shut-off valve is operated to the closed condition to interrupt the supply of fuel to the vessel. In accordance with another feature of the invention, the means which connects the load device with the shut-off valve means includes third fusible means responsive to the ambient temperature external of the vessel.

According to a further feature of the invention, solenoid means may also be provided for operating the load device to close the shut-off valve means.

BRIEF DESCRIPTION OF THE DRAWING

Other objects and advantages of the invention will become apparent from a study of the following specification when viewed in the light of the accompanying drawing, in which.

DETAILED DESCRIPTION

Figure 1:
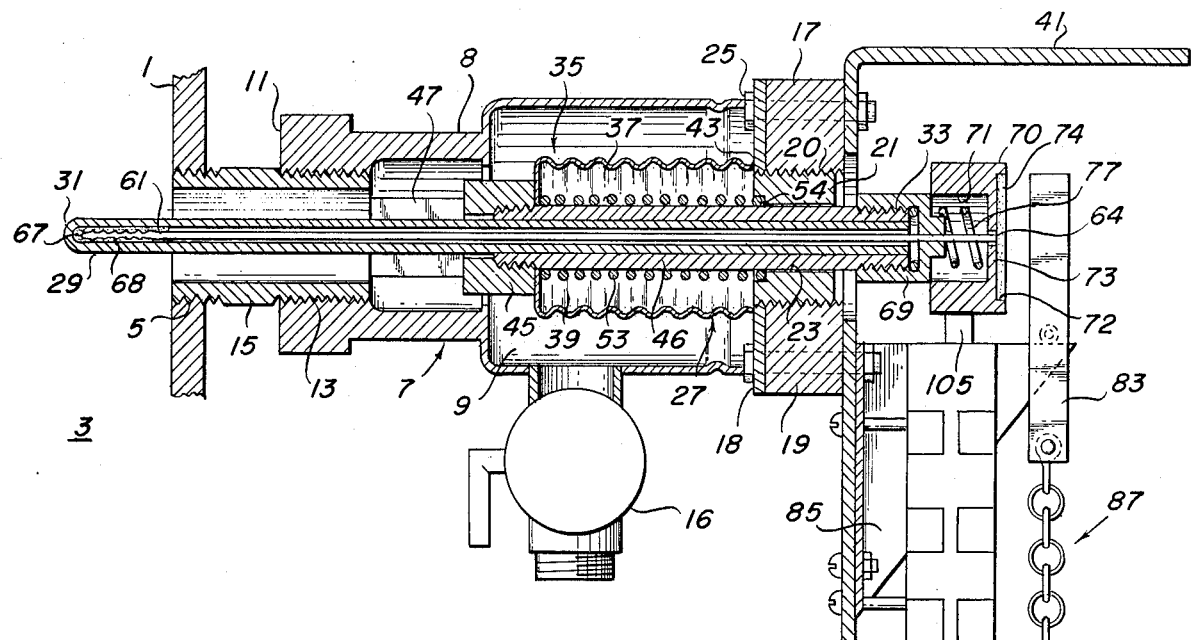
FIG. 1 is a longitudinal sectional view of the actuator means of the present invention connected with shut-off valve means.
Figure 1:
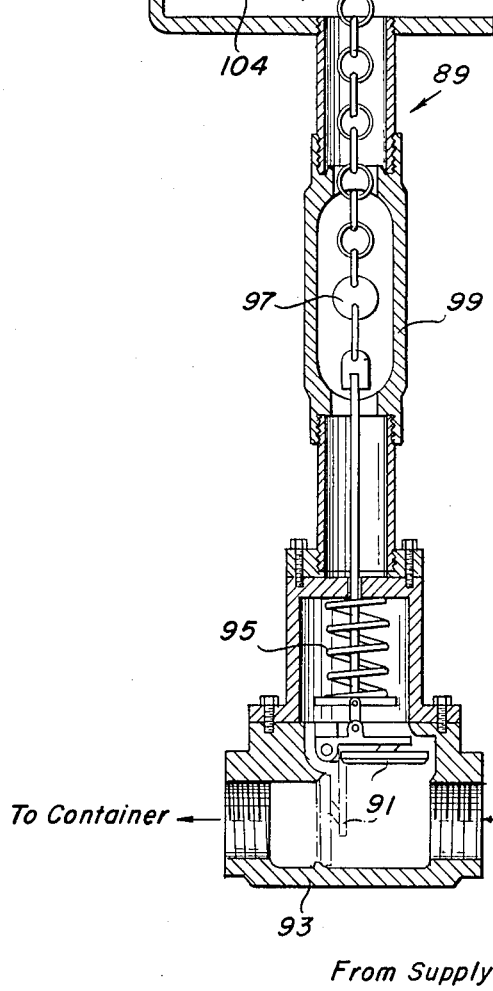

Referring first more particularly to FIG. 1, the actuator means of the present invention is adapted for connection with the wall opening 5 of a vessel 1, which, in the illustrated embodiment, comprises an oil- or gas-fired boiler.

The actuator means comprises a hollow support member 7 which contains a longitudinally movable pressure and temperature responsive assembly 27. The support means comprise a hollow body which contains a first pressure chamber 9. A first wall portion 11 at one end of the body 8 contains a first opening 13. A pipe nipple 15 connects the chamber 3 and the first pressure chamber 9 via openings 5 and 13.

Pet cock sediment drain means 16 is provided for draining accumulated moisture from the device and for testing the pressure sensing mechanism of the actuator.

A second wall portion 17 at the opposed end of the support body 8 includes a brass plate 18 and contiguous spacer block 19 containing a threaded bore 20. A bushing 21 adjustably threaded within the bore 20 contains a centrally disposed bore which defines a second opening 23 in the support means 7. The hollow body member 8 is connected with the brass plate 18 by bolts 25.

The pressure- and temperature-responsive assembly 27 comprises a tubular member 29 which terminates at one end in a closed end portion 31 defining a temperature probe disposed within the vessel chamber 3. The tubular member 29 extends from chamber 3 completely through the hollow support means 7 and terminates in an open end portion 33 beyond the second opening 23.

Expansible pressure responsive means 35 in the form of a bellows is disposed within the first pressure chamber 9 so as to define a second pressure chamber 37 which communicates with the ambient atmosphere within control panel 41 via second opening 23. One end 43 of the bellows 35 is peripherally disposed about threaded bore 20 and is secured to the stationary brass plate 18. The opposite end of the bellows is attached to a movable hollow guide piston 45 which is concentrically threadably mounted upon a hollow rod 46 through which tubular member 29 extends. Rod 46 extends through the bellows 35 and bore 23 into the housing 41. A plurality of flats 47 are formed in chamber 9 adjacent the guide piston 45, which flats mate with similar flats on piston 45 to prevent rotation of piston 45 and twisting of bellows 35. A first spring means, in the form of a compressions spring 53, is disposed in the bellows 35 about hollow rod 46 so that one end of spring 53 engages a recess 54 in the threaded bushing 21. The opposed end of spring 53 engages the movable end of the bellows and tends to expand the bellows toward the chamber 3. The bushing 21 may be adjusted to vary the compression of spring 53 and thus the external pressure force required to compress it.

A rod 61 is disposed within the tubular member 29, one end 63 of said rod terminating in the probe end 31 of the tubular member 29, while the other end 64 extends beyond the open end 33 of the tubular member 29. The rod end 63 is normally retained in probe end 31 by a first temperature-responsive fusible means 67 in the form of a body of temperature calibrated solder. A plurality of spaced projections 68 are provided on the rod end 63 to hinder undesired migration of the solder. Similar projections are also placed on the interior surface of the probe end of tubular member 29 for the same purpose.

A cap 69 having an aperture therein is connected with the end of hollow rod 46 which extends into housing 41. Rod 61 extends through the aperture of the cap to a load operating member 70 disposed adjacent the cap. The load operating member contains first and second recesses 71 and 72 on opposite sides of a wall 73. Wall 73 has an aperture therein to provide communication between the recesses. Trigger rod 61 extends through both the first recess 71 and the aperture in wall 73 and terminates at its end 64 in the second recess 72. A second temperature responsive fusible means 74 in the form of a body of temperature calibrated solder is disposed in the second recess 72 and normally retains the rod end 64 within the second recess 72. The first recess 71 is dimensioned to receive the cap 69. A second spring means 77 in the form of a compression spring is disposed within recess 71 and acts between the wall 73 and the cap 69 to bias the operating member 70 away from the cap and also to bias the trigger rod away from the probe end 31 of the tubular member 29.

The pressure and temperature responsive assembly 27 is disposed in operative relation with fluid flow control means to control the flow of a fluid from a source of supply to chamber 3. More particularly, the control means comprises a trigger member 83 disposed within the housing 41 adjacent the normal position of the operating member 70 and supported by a ledge 85 which permits displacement of the trigger member therefrom. An elongate member 87 suspended from one end of the trigger member 83 extends from the housing 41 through a conduit shown generally at 89 to a valve member 91 disposed in a fluid supply conduit 93. The valve member 91 is biased towards a closed position with respect to conduit 93 by a compression spring 95. Valve member 91 is maintained in a normally open position against the action of spring 95 when the trigger member 83 is supported on the ledge 85. Displacement of the trigger member 83 from the ledge 85 by the actuator means effects downward movement of the valve member to the closed position.

The elongate member 87 includes a temperature responsive fusible link 97 which is positioned in a portion 99 of the conduit 89 which provides direct access to the ambient atmosphere. Should link 97 be subjected to an ambient temperature exceeding a predetermined limit, the link will melt, thereby separating the elongate member 89 and permitting the valve member to close.

OPERATION

In the operation of this embodiment, the valve member 91 is closed in response to any one of several conditions—namely, either the temperature or pressure within the chamber 3 exceeding predetermined limits, the temperature within the panel housing 41 exceeding a predetermined limit, or the temperature of the ambient atmosphere adjacent the boiler exceeding a predetermined limit.

Figure 2:
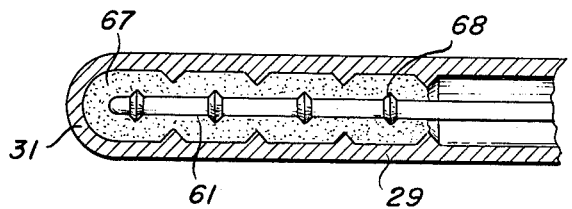
FIGS. 2 and 3 are detailed views of the probe means with the fusible means in the non-melted and melted conditions, respectively.
Figure 3:
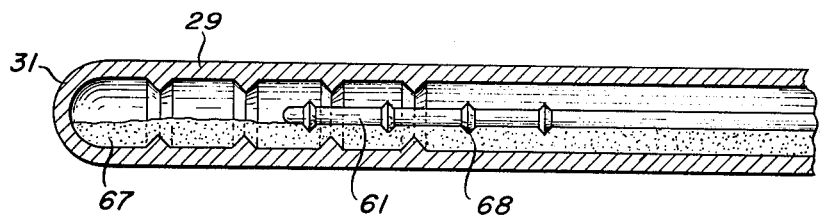
Figure 4:
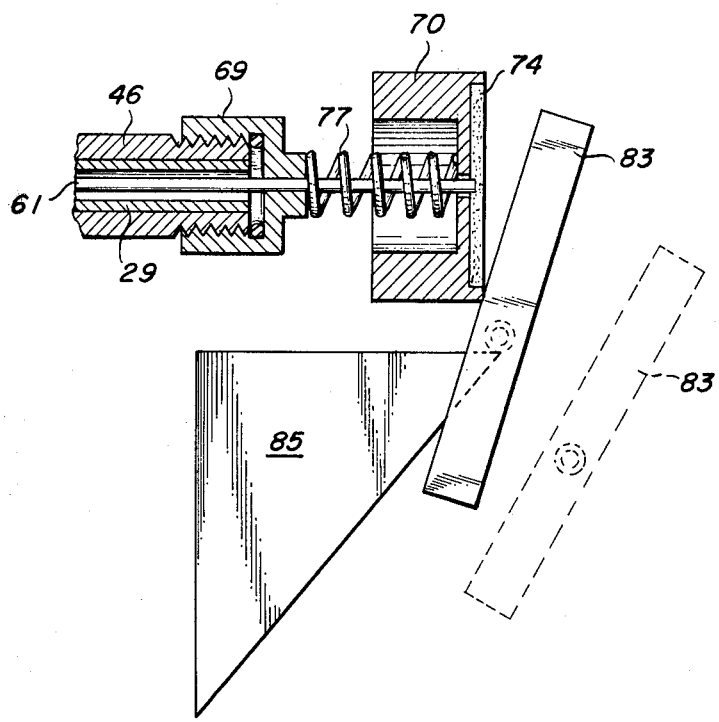
FIG. 4 illustrates the operation of the load device by the load operating member when the fusible means at the probe end (FIG. 2) has melted to release the rod member.

FIG. 2 illustrates the rod 61 normally at the probe end 31 within the tubular member 29 prior to the occurence of an excessive temperature or pressure within the chamber 3. Upon excessive temperature being reached within the chamber 3, the first temperature responsive fusible means 67 will melt (FIG. 3) and thus free the rod 61 for movement from the probe end 31 of tubular member 29. With trigger rod 61 no longer restrained by fusible means 67, the spring 77 forces the operating member to displace the member 83 from ledge 85 as shown in FIG. 4. The valve member 91 will thus no longer be supported and will be closed by the action of spring 95.

Figure 5:
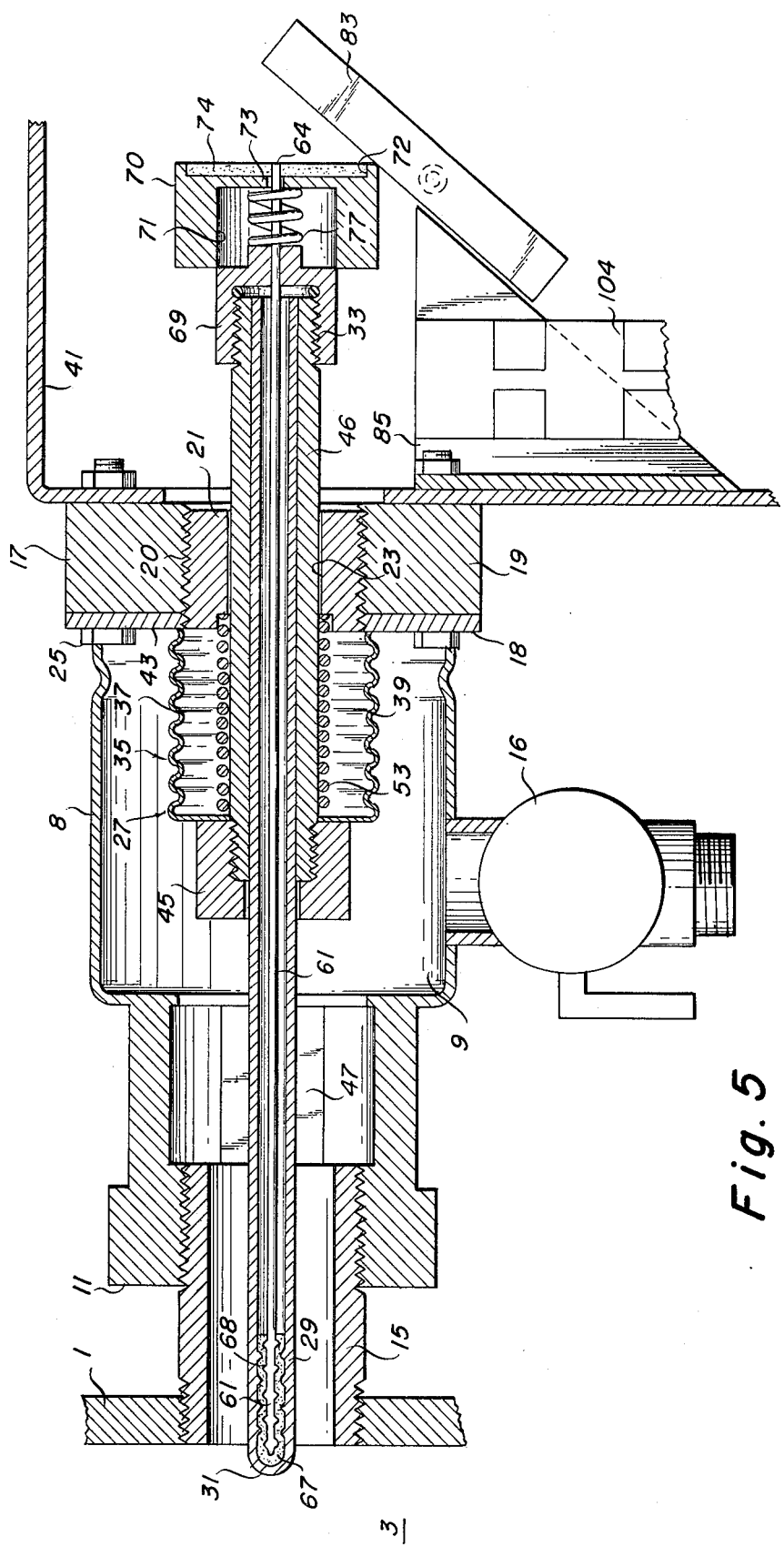
FIG. 5 is a sectional view illustrating the operation of the load device by the temperature and pressure-responsive assembly when the pressure in the vessel exceeds a predetermined limit.

FIG. 5 illustrates the actuator after it has been subjected to an excessive pressure in the chamber 3. As the pressure in the chamber 3, and, consequently, in the first pressure chamber 9, exceeds a predetermined limit established by spring 53, the entire pressure- and temperature-responsive assembly is moved away from the chamber 3 in a first direction toward the device 83, thereby displacing the member 83 off of the ledge to effect valve closure. More specifically, the excessive pressure in chamber 9 causes the bellows 35 to be compressed against the action of spring 53. The guide piston 45 is moved with the bellows 35 toward the second opening 23 while the hollow rod 46, tubular member 29, and trigger rod 61 are moved through the opening 23. The plug 69, spring 77 and operating member 70 will be carried along by this movement whereby operating member 70 will displace load device 83 from ledge 85.

Figure 6:
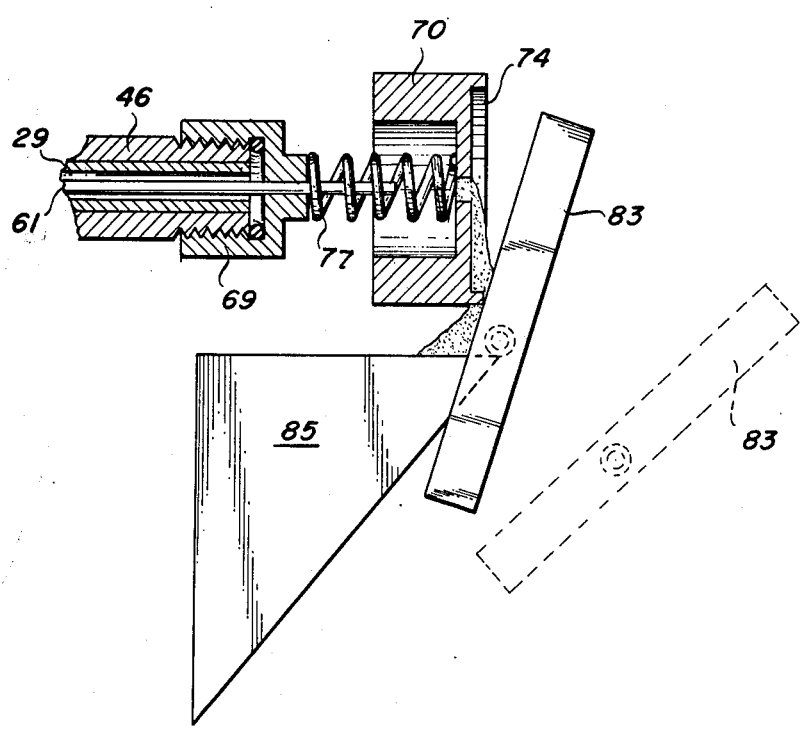
FIG. 6 illustrates the operation of the load device by the operating member when the fusible connection between the rod and the load operating member has melted to release the load operating member.

Upon the occurrence of an excessive temperature condition within the panel housing 41, the second temperature-responsive fusible means melts to release the trigger rod end 64, whereupon the spring 77 causes the operating member 70 to displace the device 83 from the ledge (FIG. 6) and thereby effect valve closure.

In the event that the temperature of the ambient atmosphere outside the container wall 1 exceeds a predetermined temperature, the fusible link 97, in direct communication with the atmosphere via conduit portion 99, melts, thus separating the elongate member 87 and permitting the valve member 91 to close the conduit 93.

Figure 7:
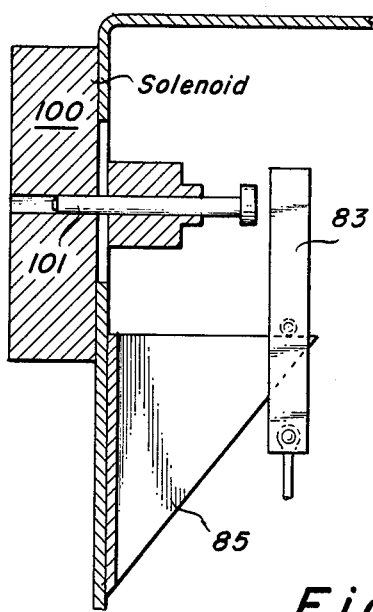
FIG. 7 illustrates the provision of auxiliary solenoid means which may be used in conjunction with the actuator means of FIG. 1 for operating the load device.

Referring now to FIG. 7, the apparatus of FIG. 1 may also be provided with auxiliary solenoid means 100 having an armature 101 arranged to displace the load device from its support ledge 85 to close the shut-off valve means as described above. The solenoid means may be operated by suitable switch means (such as a manually operated switch, not shown).

Figure 8:
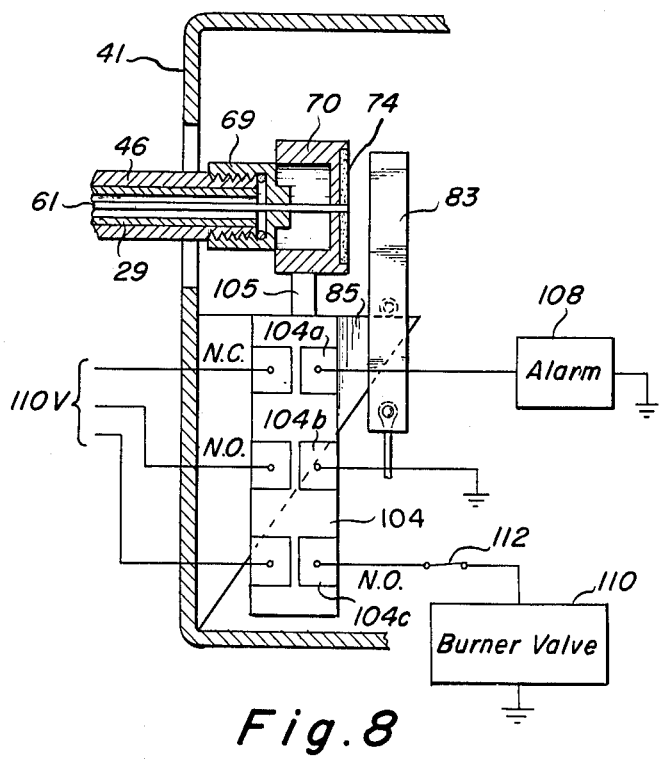
FIG. 8 is a detailed schematic diagram of the electrical circuitry associated with the auxiliary switch means of FIG. 1.

Referring now to FIG. 8, switch means 104 is mounted within the housing 41 for operation by the load operating member 70. The switch means includes a first pair of normally closed contacts 104a connected to the alarm means 108, a second pair of normally open contacts 104b connected with ground, and a third pair of normally open contacts connected with the normally closed burner valve means 110 of the boiler via manual switch 112. The switch means also includes an operating member 105 that is normally maintained in the illustrated first position by the load operating member 70 to open the circuit to alarm means 108, and to close the circuits to ground and to the burner valve means 110. When the operating member 70 is displaced to the right to displace the load member 83 from ledge 85, switch operating member 105 is released to close the alarm circuit and to open the circuit to ground and to the burner valve means 110.

Figure 9:
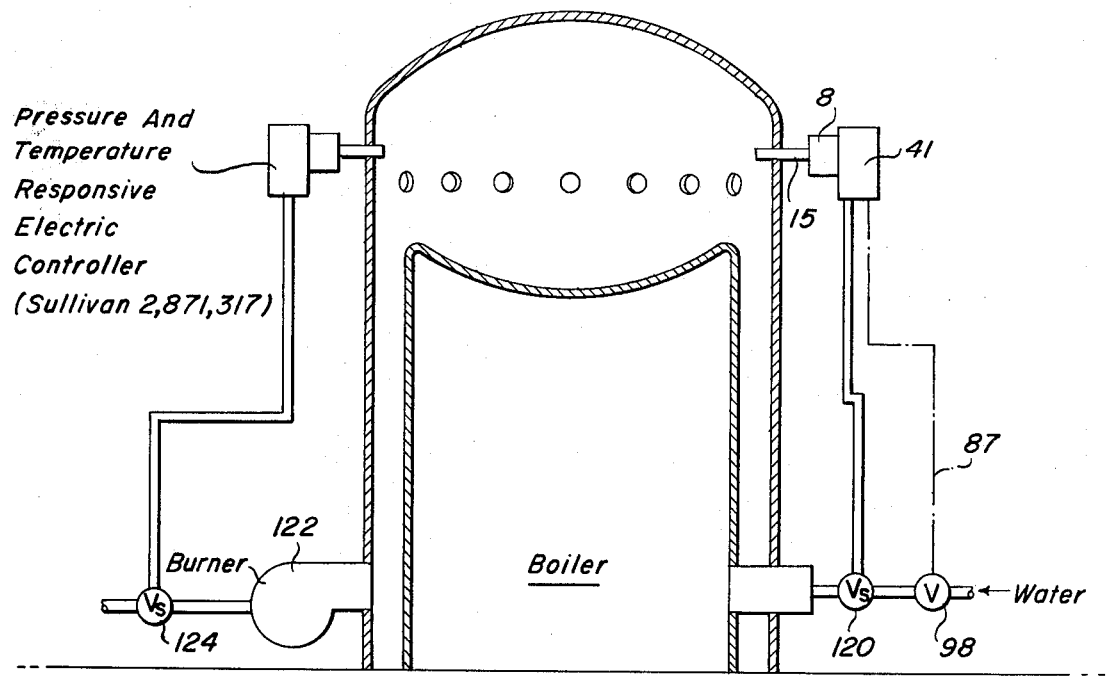
FIGS. 9 and 10 illustrate boiler and furnace installations, respectively, including the control means of the present invention.
Figure 10:
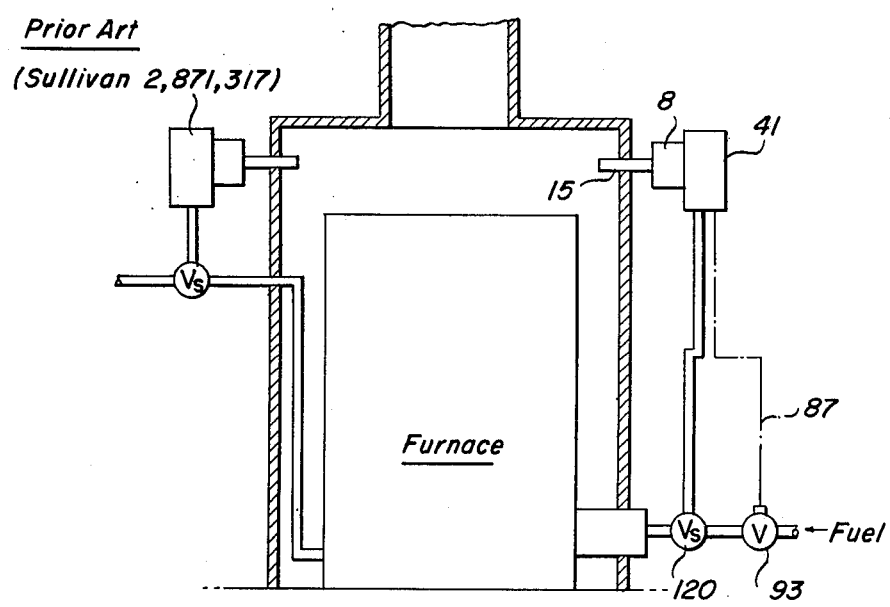

The pressure and/or temperature responsive control means of the instant invention has utility in various types of installations, as shown nin FIGS. 9 and 10. For example, in the boiler installation of FIG. 9, the controller may be utilized to control the water supply valve 93 to the boiler, a normally-closed solenoid valve 120 also being connected in the water supply line. The solenoid valve 120 is so connected with the electric switch means 140 that when the output member 70 is in the FIG. 8 position, solenoid valve 120 is energized and maintained open, and shut-off valve 93 is maintained open by the mechanical linkage 87. Fuel is supplied to the burner 122 via solenoid valve 124 which is normally maintained open by suitable pressure and/or temperature responsive switch means (such as the control means of my prior U.S. Pat. No. 2,871,317, for example).

Similarly, in the gas or oil-fired furnace arrangement of FIG. 10, the shut-off valve 93 and the solenoid valve 120 may be connected in the fuel supply line to the furnace burner.

While in accordance with the provisions of the Patent Statutes the preferred forms and embodiments of the invention have been illustrated and described, it will be apparent to those skilled in the art that various modifications may be made in the apparatus described and illustrated without deviating from the inventive concepts set forth above.

What is claimed is:

1. Pressure- and temperature-responsive actuator means for operating a load device (83) in response to the pressure and temperature conditions within the chamber of a vessel (1), and to the temperature conditions external of the vessel, said vessel containing a wall opening (5), comprising a. a hollow support member (7) containing a first chamber (9), said support member being adapted for connection at one end with said vessel wall opening, said support member having a first opening at said one end affording communication between the vessel chamber and said first chamber, said support member having at its other end a second opening (23), the load device being spaced from said second opening externally of said support member; and b. a pressure- and temperature-responsive assembly mounted for longitudinal displacement in said second opening to operate said load device, said assembly including
   1. a tubular member (29) one end of which is closed to define a probe adapted to extend into the vessel chamber via said first support opening and the vessel wall opening, the other end of said tubular member being open and extending through said support member second opening;
   2. expansible pressure-responsive means (35) disposed in said first pressure chamber and defining therein a second pressure chamber (37) which is in communication, via said second wall opening, with the adjacent region external of said support member;
   3. first spring means (53) biasing said tubular member axially away from the load device, said expansible pressure-responsive means being connected between said hollow support member and said tubular member to produce axial displacement of said tubular member toward said load device when the pressure in said first chamber exceeds that of said second chamber by a predetermined amount;
   4. a rod (61) arranged longitudinally within said tubular member, one end of said rod terminating adjacent the closed probe end of said tubular member and the other end of said rod extending beyond the open end of said tubular member;
   5. first temperature-responsive fusible means (67) adjacent the closed end of said tubular member normally connecting said one end of said rod with said tubular member;
   6. a load operating member (70) adjacent said other end of said rod;
   7. second temperature-responsive fusible means (74) normally connecting said load operating member with said other end of said rod; and
   8. second spring means (77) arranged between said load operating member and said other end of said tubular member for biasing said rod longitudinally away from said closed end of said tubular member, whereby, when the fluid pressure of the first chamber exceeds that of said second chamber by a predetermined amount, said pressure and temperature assembly is displaced longitudinally toward the load device against the biasing force of said first spring means, whereby when the temperature sensed by the probe exceeds the melting temperature of said first fusible connecting means, said rod is released and is longitudinally displaced toward the load device by said second spring means, and whereby when the melting temperature of said second fusible means is exceeded, said operating member is released and is displaced toward the load device by said second spring means.

2. Apparatus as defined in claim 1, and further including shut-off valve means (93) for controlling the flow of combustion fluid to said vessel, said shut-off valve means including
 a. a valve housing (93);
 b. a valve member (91) connected for movement between open and closed positions in said valve housing;
 c. means (87) connecting said valve member with said load device to normally maintain said valve member in the open condition, whereby when said load device is operated by said load operating member, said valve member is released for displacement toward the closed position, thereby to interrupt the supply of combustion fluid to the vessel.

3. Apparatus as defined in claim 2, wherein said connecting means includes third temperature-responsive fusible means (97).

4. Apparatus as defined in claim 2, and further including third spring means (95) biasing the valve member toward its closed position.

5. Apparatus as defined in claim 2, and further including housing means (41) connected with said other end of said support member, said housing means including a ledge (85) for supporting said load device in a position maintaining said valve member in an open position, said load device being displaceable off of said ledge by said operating member to release said valve member for displacement toward the closed position.

6. Apparatus as defined in claim 5, and further including solenoid means for displacing said load device from said ledge, said solenoid means including a stator (100) connected with said housing means, and an armature (101) terminating at one end adjacent the load device.

7. Apparatus as defined in claim 5, and further including electrical switch means (104) connected in said housing means, said switch means including a switch operator (105) normally maintained in a first operating position by said load-operating member, said switch operator being displaceable toward a second operating position when said load operating member is displaced toward said load device.

8. Apparatus as defined in claim 7, and further including burner valve means for supplying fuel to the burner of the boiler, and means connecting said burner valve means with said switch means to cause the burner valve means to be in open and closed conditions when said switch operator is in said first and second operating positions, respectively.

9. Apparatus as defined in claim 8, and further including alarm means, and means connecting said alarm means with said switch means to cause said alarm means to be in de-activated and activated conditions when said switch operator is in said first and second operating positions, respectively.

10. Apparatus as defined in claim 1, wherein said expansible pressure-responsive means comprises a bellows member (35), piston means (45) connecting one end of said bellows member with said tubular member, and means connecting the other end of said bellows member with said other end of said hollow support member.

11. Apparatus as defined in claim 10, wherein said first spring means comprises a compression spring (53) arranged within said bellows member concentrically about said tubular member.

12. Apparatus as defined in claim 12, wherein said support member contains at said other end an externally threaded tubular bushing (21) threadably mounted in a threaded bore contained in said support member, the bore of said bushing defining said second opening, said first spring means being in abutting engagement at one end with said bushing, whereby the biasing force of said first spring means may be adjusted by axially displacing said bushing relative to said support member.

13. Apparatus as defined in claim 1, and further including a cap member (69) connected with the open end of said tubular member, said cap member containing an axial bore for slidably receiving said rod, said second spring means comprising a compression spring arranged concentrically about said rod between said cap member and said load operating member.

* * * * *